F. W. WAKEFIELD.
LIGHTING FIXTURE.
APPLICATION FILED APR. 25, 1913.
1,111,875.
Patented Sept. 29, 1914.
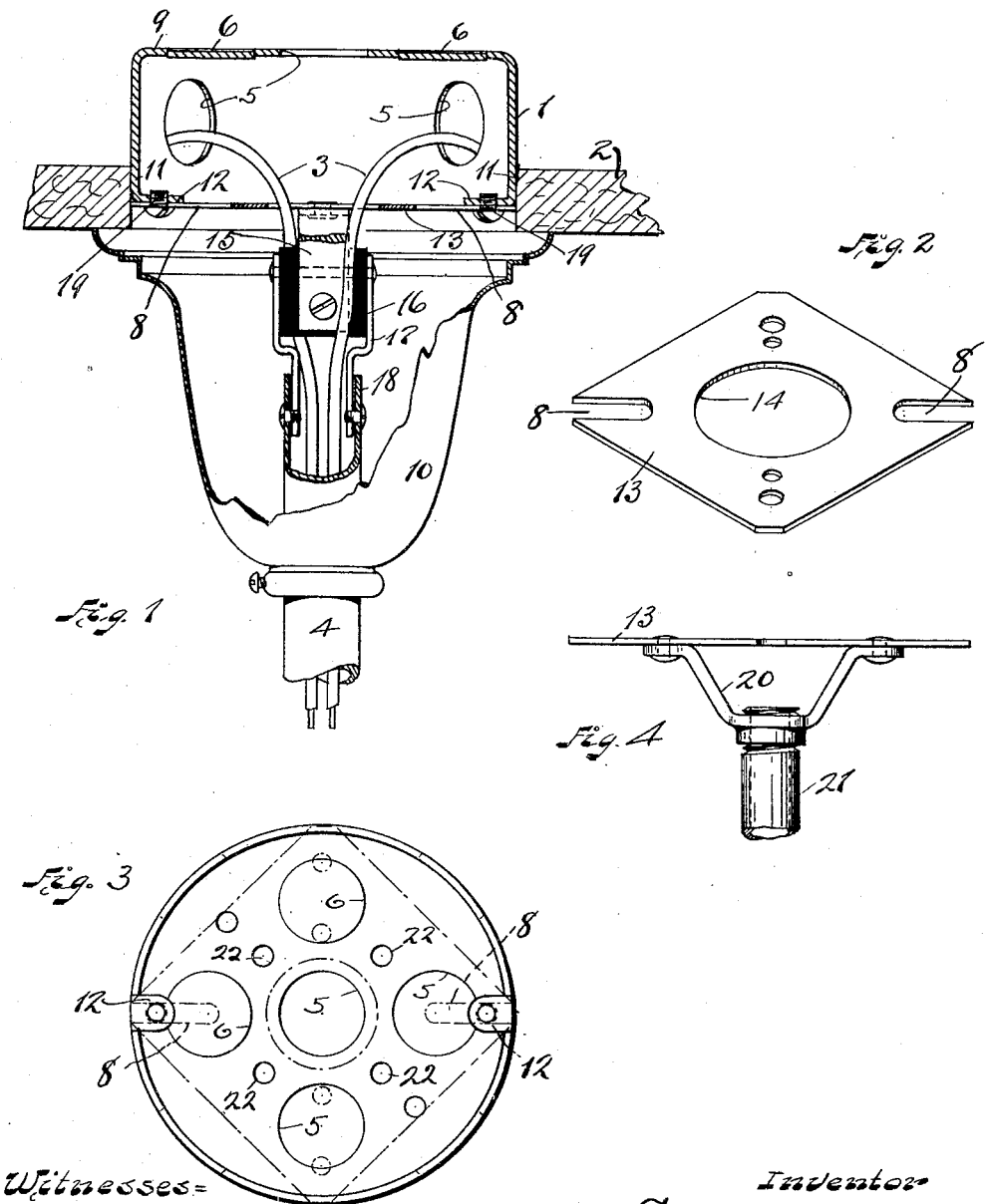

UNITED STATES PATENT OFFICE.

FREDERICK W. WAKEFIELD, OF VERMILION, OHIO, ASSIGNOR TO THE F. W. WAKEFIELD BRASS COMPANY, OF VERMILION, OHIO, A CORPORATION OF OHIO.

LIGHTING-FIXTURE.

1,111,875.   Specification of Letters Patent.   Patented Sept. 29, 1914.

Application filed April 25, 1913. Serial No. 763,573.

*To all whom it may concern:*

Be it known that I, FREDERICK W. WAKEFIELD, a citizen of the United States, and a resident of Vermilion, county of Erie, and State of Ohio, have invented a new and useful Improvement in Lighting-Fixtures, of which the following is a specification, the principle of the invention being herein explained and the best mode in which I have contemplated applying that principle, so as to distinguish it from other inventions.

The subject of the present invention is an improved lighting fixture designed for use with an outlet or junction box of the usual type for the purpose of providing an improved means for attaching a pendant fixture to the ceiling. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a section through my improved device showing the same in position in a ceiling and showing a fixture (partly in elevation) attached to said device; Fig. 2 is a perspective view of the fixture receiving plate; Fig. 3 is a bottom view of said plate attached to the junction box; and Fig. 4 is a side elevation of said plate attached to a fixture.

I show a junction box 1 or, as it is more commonly called, an outlet box, which is adapted to be sunk into a ceiling 2 for the purpose of permitting the attachment of the electrical cables 3 which are embedded therein to the connections which extend to the socket (not shown) in a suitable fixture 4, and to this end the box 1 is provided with a number of apertures 5 which are normally closed by partially stamped out metal pieces 6 which may be pushed in upon the application of but little force, thus leaving an opening free for the entrance of the cables. It has been usual to connect up the crow-foot 7 to the ceiling through the top or end of the outlet box by means of long screws passing through apertures in the top of the box. The crow-foot or other fixture would thus be attached, not to the outlet box, but to the ceiling, and the inclosing fixture which might be a canopy 10 as shown in Fig. 1 or the like, would be disposed about this crow-foot or its extension.

It is desirable in many cases to attach the fixture directly to the outlet box, but this is of course impossible when the box is once embedded in the ceiling, and it is to providing means for this end that the present invention is designed. For this purpose the lower sides 11 of the outlet box are provided with inturned lugs 12 which are apertured to permit of the attachment of a plate 13 shown with a central aperture 14 to permit of the passage of electrical wires down to the socket. Upon this plate there may be mounted two extending arms 15 attached to a block 16 of insulating material which is in turn provided with two other downwardly extending arms 17, thus forming an insulated universal joint, to the lower member of which may be attached the socket-receiving member 18. The plate 13 is removably attached to the lugs by means of screws 19 or other suitable members which pass through slots 8 in such plate and the latter may thus be readily removed when, if desired, the usual crow-foot may be attached to the ceiling in the usual methods by screws which pass through the top of the outlet box.

The type of fixture which is attached to the plate is of course not important, as either an insulated joint may be used as shown in Fig. 1 or simply a bracket 20, as shown in Fig. 4, the bracket being provided with a threaded aperture into which there is inserted a tube 21 adapted to receive the electrical wires, the tube being threaded at its lower end to adapt it to be attached to a suitable socket-receiving member.

The advantages of the present construction are the convenience of assembly and simplicity. Formerly it was often an extremely long and difficult task to properly attach the fixture receiving member to the ceiling through the outlet box, whereas now it is relatively simple to attach and detach. Furthermore, if some type of fixture is to be used which requires the old method of connection, the same can still be used by omitting the plate 13 and attaching the member to the ceiling as formerly through the apertures 22 which are provided against such a contingency.

It will be noticed that the lugs 12 may be used to attach the usual cover plate as well as for the purpose of receiving the adjustable fixture plate 13.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination of an outlet box provided with an aperture in its top and a plurality of inwardly directed lugs at its open end; and a plate provided with a plurality of apertures adapted to permit the convenient attachment of various fixture supports, said plate being removably attached to said lugs, whereby upon removal of said plate, other fixture supports may be attached to the material behind the top of said box through such aperture.

2. The combination of an outlet box provided with inturned lugs; and a plate provided with open slots adapted to be engaged by screws secured to such inturned lugs on the outlet box, said plate being also provided with apertures permitting the attachment of a fixture to said plate and the passage through the same of the electrical conductors.

3. As a new article of manufacture, an outlet box stamped from sheet metal and having two oppositely disposed inturned lugs, and a fixture-receiving plate also stamped out of sheet metal and provided with oppositely disposed slots adapted to be engaged by screws secured to such inturned lugs on said box, said plate also having apertures adapted to be engaged by a fixture support and to permit the passage of the electrical conductors.

Signed by me, this 22nd day of April, 1913.

FREDERICK W. WAKEFIELD.

Attested by—
  GERALD L. BASIL,
  GEO. KLAAR.

---

Copies of this patent may be obtained for five cents each, by addressing the "Commissioner of Patents, Washington, D. C."